(12) United States Patent
Liu et al.

(10) Patent No.: US 7,707,770 B2
(45) Date of Patent: May 4, 2010

(54) WATERING DEVICE

(76) Inventors: Mimi Liu, 544 N. Brighton St., Burbank, CA (US) 91506; Kevin G. O'Brien, 110 El Nido Ave., #7, Pasadena, CA (US) 91107; Mark M. Ensworth, 8336 E. Ironwood Ave., Orange, CA (US) 92869

( * ) Notice: Subject to any disclaimer, the term of this patent is extended or adjusted under 35 U.S.C. 154(b) by 126 days.

(21) Appl. No.: 10/987,400

(22) Filed: Nov. 12, 2004

(65) Prior Publication Data
US 2006/0112626 A1 Jun. 1, 2006

(51) Int. Cl.
*A01G 29/00* (2006.01)
(52) U.S. Cl. .......................... 47/48.5; 405/36
(58) Field of Classification Search ................ 47/48.5, 47/79, 80; 43/131, 132.1; 405/36, 42–45; 239/201
See application file for complete search history.

(56) References Cited

U.S. PATENT DOCUMENTS

| | | | |
|---|---|---|---|
| 419,242 A | 1/1890 | Brown | |
| 1,971,390 A * | 8/1934 | Yahres | 47/48.5 |
| 3,333,773 A | 8/1967 | Hutchinson | |
| 3,755,966 A | 9/1973 | Smith | |
| 4,578,897 A | 4/1986 | Pazar et al. | |
| 4,685,827 A | 8/1987 | Sibbel | |
| 4,697,952 A | 10/1987 | Maddock | |
| 4,726,143 A * | 2/1988 | Steinbeck | 47/48.5 |
| 4,739,789 A | 4/1988 | Hamilton | |
| 5,097,626 A | 3/1992 | Mordoch | |
| 5,761,846 A | 6/1998 | Marz | |
| 5,795,100 A | 8/1998 | Thomas et al. | |
| 5,809,692 A | 9/1998 | Kesler | |
| 5,924,240 A | 7/1999 | Harrison | |
| 5,956,899 A | 9/1999 | DiOrio | |
| 5,975,797 A | 11/1999 | Thomas et al. | |
| 5,996,279 A | 12/1999 | Zayeratabat | |
| 6,161,776 A | 12/2000 | Byles | |

(Continued)

FOREIGN PATENT DOCUMENTS

| | | | |
|---|---|---|---|
| FR | 2556929 A1 * | 6/1985 | |
| GB | 2249463 A * | 5/1992 | |
| JP | 2004187557 A * | 7/2004 | |

*Primary Examiner*—Darren W Ark
*Assistant Examiner*—Kristen C Hayes
(74) *Attorney, Agent, or Firm*—Fitch, Even, Tabin & Flannery (57) ABSTRACT

A watering device for providing water to a sub-surface level is provided. The watering device includes a body portion for distributing water radially therefrom and along its length. The watering device includes an irrigation assembly for emitting water from a water source, the irrigation assembly emitting the water within the watering device, and the water then being distributed through the body portion to surrounding soil. The irrigation assembly may be supported by the body portion. The irrigation assembly may include a bubbler, and may include a check valve. The device may include a top cap including retaining structure for providing a generally vertical or other desired orientation to the irrigation assembly. The device may further include a bottom cap that generally restricts the flow of water out of the bottom of the device and cooperates with body portion to direct water radially from the device.

19 Claims, 5 Drawing Sheets

U.S. PATENT DOCUMENTS

| | | | |
|---|---|---|---|
| 6,540,436 B2* | 4/2003 | Ogi | 405/45 |
| 2004/0074997 A1 | 4/2004 | Sacks | |
| 2004/0108391 A1 | 6/2004 | Onofrio | |
| 2004/0181999 A1* | 9/2004 | Amsellem | 47/48.5 |
| 2004/0195360 A1 | 10/2004 | Walker | |
| 2005/0040256 A1 | 2/2005 | Santos | |

* cited by examiner

WATERING DEVICE

CROSS-REFERENCE TO RELATED APPLICATION

This application is related to United States Design Patent Application No. 29/217,080, now patent D524,611, filed Nov. 12, 2004, entitled "WATERING DEVICE," the specification of which is incorporated by reference in its entirety.

FIELD OF THE INVENTION

The invention relates to a watering device and, in particular, a watering device for providing water below ground or grade level.

BACKGROUND OF THE INVENTION

The root system of a plant is utilized by the plant for absorbing nutrients, gasses, and water into the plant. The roots spread towards the region in the soil or ground in which water is available. More broadly speaking, the root network develops so as to maximize the ability of the plant to absorb water from the soil.

In many environments, soil holds water at a reasonably constant level from the surface down to a certain depth. That is, a tree in a forest does not only develop a root network close to the surface because the soil tends to capture and retain water close to the ground or grade level, as well as many feet down from the surface or grade level. Therefore, the roots radiate outward to maximize the volume of earth from which the tree can draw sustenance.

Conversely, if the soil has water only to a shallow depth, the roots of plants spread close to the surface and within that shallow depth. In an arid or desert environment, the sandy-type soil does not retain water very well. Desert plants tend to receive water only from the surface, soon after a watering or rain. Thus, these plants tend to develop roots only near the ground surface. Urban environments often utilize trees or shrubs planted in a relatively small, confined amount of soil surrounded by a concrete box or by non-water retaining grading, such as paving materials. Therefore, urban plants tend to develop roots that are concentrated near the surface, as the water the plants receive is also concentrated near the surface.

In addition, plants utilize their roots to remain generally upright and firm in the ground in which it is living. In general, the plant does not intelligently intend for its roots to grow based upon an inherent knowledge of sound stability for the plant. Therefore, a shallow root system developed in response to moisture levels being insufficient at greater depth results in a plant that is relatively unstable in the ground.

Accordingly, there has been a need for an improved watering system for encouraging downward root system growth.

DESCRIPTION OF THE PREFERRED EMBODIMENT

Referring to the Figures, a watering device 10 is depicted for providing water to a sub-surface layer of soil for allowing water delivery to roots of, for instance, decorative plants, trees, and shrubs. The watering device 10 has an upper end 12 and a lower end 14 extending between a body portion 16 such that the lower end 14 and body portion 16 are embedded or otherwise sunk into ground proximate to a plant such as a shrub or a tree with the upper end 12 generally at the ground surface or grade level. The device 10 includes an inlet 18 for connecting to a water source (not shown). The watering device 10 is typically utilized as part of an irrigation system including a plurality of devices 10 and a network of water distribution pipes that deliver water from a water source to the devices. The irrigation system preferably includes controls for activating or shutting off the system, and the controls may include timers and/or moisture sensors for automated operation.

Figure 1:
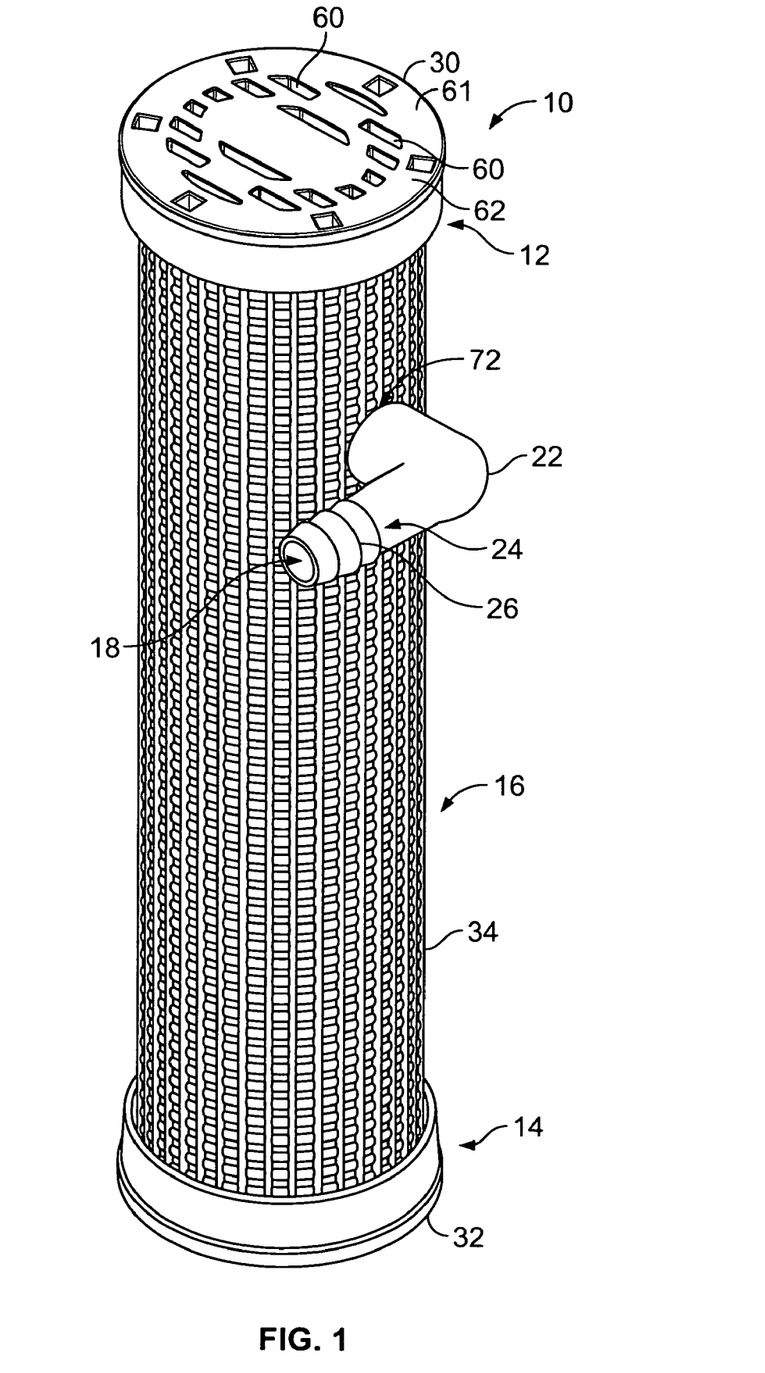
FIG. 1 is a perspective view of a watering device in accordance with an aspect of the present invention.
Figure 2:
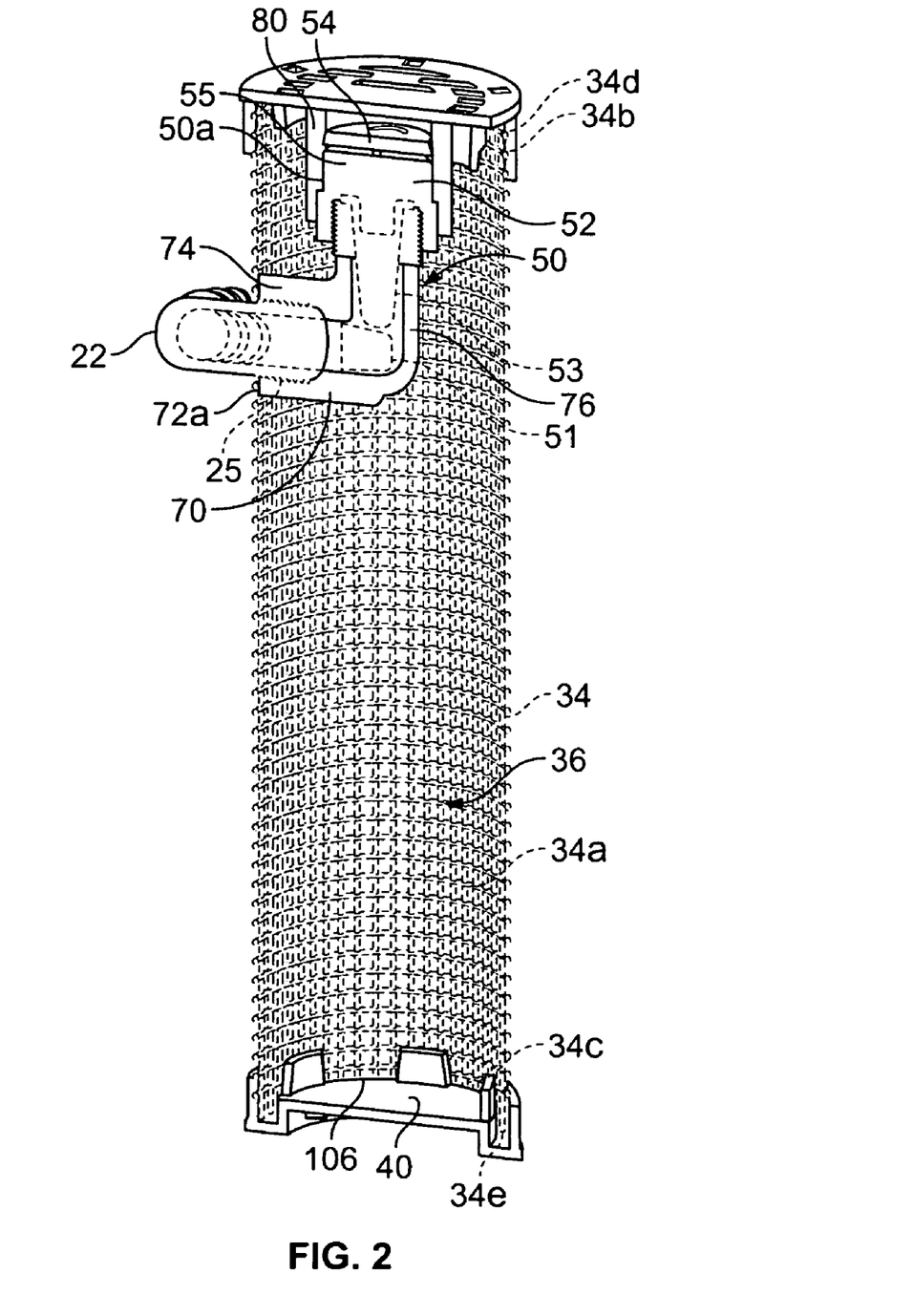
FIG. 2 is a partial cross-sectional view of the watering device of FIG. 1.
Figure 3:
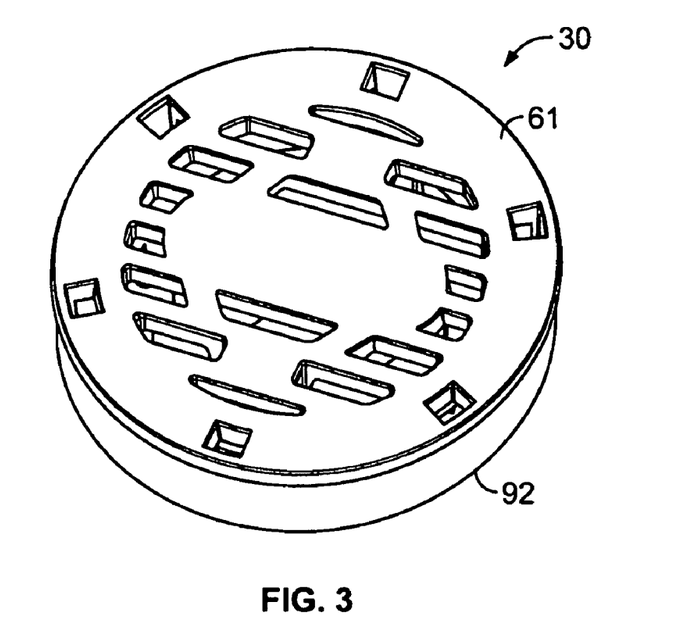
FIG. 3 is a perspective view of a top cap of the watering device showing openings therein.
Figure 4:
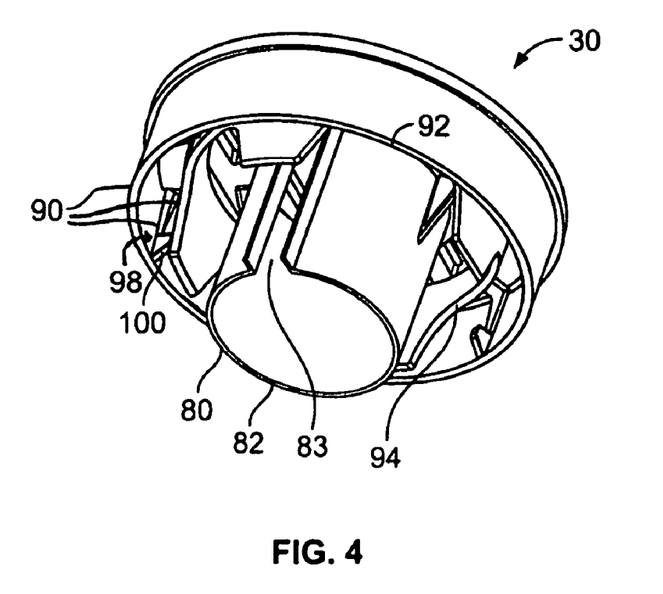
FIG. 4 is a perspective view of the top cap showing retaining structure on a bottom side thereof.
Figure 5:
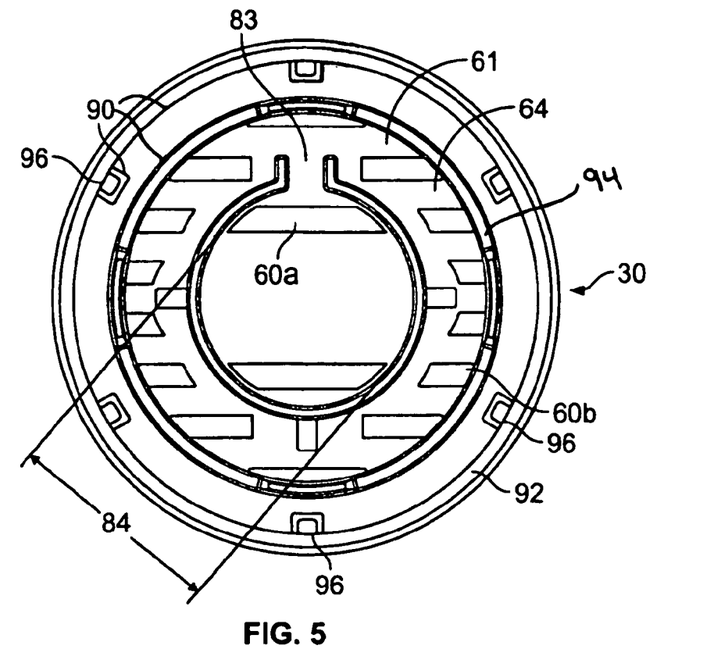
FIG. 5 is a bottom plan view of the top cap showing the retaining structure and mounting structure for securing the top cap with the watering device.

As depicted, the inlet 18 is formed on an elbow-shaped input pipe 22 having an inlet end 24 and a connection end 25 (see FIG. 2). The inlet end 24 is connected to the water source piping. Often, the piping is already embedded in the ground, and it is simplest to provide a hole in the ground for the device 10 to be inserted. Accordingly, it is preferred to have a quick-connect structure on the inlet end 24 for easily attaching to the piping. In the present embodiment, the inlet end 24 includes a spiral barb 26 onto which a pipe may be forced to provide a generally water-tight connection that resists the pipe being forced off of the inlet end 24. In this manner, the device 10 may be inserted into a hole sized relatively close to the size of the device 10, and the pipe may then be connected thereto. It is common for the proximately located shrub, for instance, to already be planted in the ground, in which case the size of the hole for the device 10 should be minimized so as not to disturb the root system or root ball. In addition, by securely connecting to the pipe, any shifting due to replacing dirt or soil around the device 10 does not cause the device 10 to loose the connection to the pipe.

The water source delivers water to the embedded device 10, which in turn delivers water along its length to the surrounding soil and to the roots of the proximately located plant. Each plant may be provided with one or more devices 10. Because of the length of the device 10, and the device 10 being embedded in the soil, water is able to reach a depth greater than merely surface watering may. This is particularly true in environments that are arid or otherwise susceptible to rapid evaporation.

The device 10 includes a top cap 30, a bottom cap 32, and a wall or sleeve 34 extending between the caps 30, 32, each of which is generally cylindrical. The top cap 30 includes a top wall 61 having a series of openings 60 passing from a top surface 62 to a bottom surface 64 of the wall 61 so that fluid, such as water or gasses, may pass from an interior cavity 36 to the environment. The sleeve 34 is a semi-rigid porous material to allow water to pass from its interior cavity 36 to soil located thereabout to feed the plant roots. Preferably, the sleeve 34 is a mesh with openings or pores sized to minimize the amount of soil or dirt that may enter into the cavity 36. Furthermore, the sleeve 34 may be covered by a porous cloth (not shown) for restricting the entry of soil into the cavity 36, such as in the event the soil is of a sandy-type.

The bottom cap 32 is secured to the sleeve 34 at the lower end 14 of the device 10. The bottom cap 32 has a central plate-like portion 40 so that water located within the cavity 36 and on a top surface 42 is somewhat retained thereon. Though some water does pass through openings 46, discussed below, the majority of the water is retained above the bottom cap 32 so that the water passes through the sleeve and into the surrounding soil in a radial direction.

In use, the water enters the device 10 at the inlet 18. The input pipe 22 is connected at its connection end 25 to an irrigation assembly 50 located within the cavity 36. The irrigation assembly 50 has an upper end 55 from which water is emitted. For example, the irrigation assembly 50 may include a bubbler 52 supported by a top plate 54 such that water passes through the bubbler 52 and emits radially in a downward direction. Additionally, the irrigation assembly 50 may include a check valve 51. It should be noted that many irrigation apparati may be utilized, as is known in the art.

The water exiting the irrigation assembly 50 passes downward through the cavity 36. Representatively, the irrigation assembly 50 may permit various flow rates, depending on the bubbler 52 used. As the sleeve 34 is generally semi-rigid, it is sufficiently pliable to conform to incongruities in the hole in which it is located while also being sufficiently rigid to obviate any need for internal support. That is, it is not necessary to support the sleeve structure 34 by locating rocks or gravel within the cavity 36. The water passing downward through the cavity 36 may simply drip or stream downward through cavity, or may run along an interior surface 34a of the sleeve 34. In the latter case, a portion of the water passes through the sleeve 34 and is immediately absorbed by surrounding soil. Otherwise, the water passes towards the lower portion or end 14.

During operation, the cavity 36 will begin to fill with water so that the water may pass through the sleeve 34 to surrounding soil. In this manner, the water absorption is concentrated towards the soil surrounding the lower end 14 of the device 10. The water column within the cavity 36 also provides a force gradient by virtue of its mass, thereby assisting to direct water downward and radially outward. Accordingly, the water is delivered to the surrounding soil at a depth beyond a surface layer. This retards the evaporation of water into the environment that happens with surface watering, and encourages root growth towards the water source located below the surface level. Such root growth promotes trees and shrubs and other plants being well embedded and networked by the root system.

As the water level in the cavity 36 increases, it may reach the irrigation assembly 50. This may occur from flow into the cavity from the irrigation assembly 50, from flow from outside of the device 10 such as would occur if the device 10 were located on a low point of a graded slope, or a combination thereof. The previously mentioned check valve 51 prevents water in the cavity 36 to flow back into the irrigation assembly or piping, which may otherwise cause damage.

As can be seen in FIG. 2, the input pipe 22 is connected to the irrigation assembly 50. More specifically, the irrigation assembly 50 includes an elbow-shaped assembly pipe 70. The assembly pipe 70 is internally threaded, and the input pipe 22 includes external threads for mating therewith. The sleeve 34 includes a side port 72 through which the input pipe 22 is inserted and then rotated relative to the assembly pipe 70 for threadably mating the input pipe 22 and assembly pipe 70. When assembled, the irrigation assembly 50 is supported by resting on a portion 72a of the side port 72 (see FIG. 2).

The sleeve 34 is generally open at its top end 34b so that the irrigation assembly 50 may inserted into the cavity 36, and the assembly pipe 70 is aligned with the side port 72. In this configuration, the assembly pipe 70 has a lateral section 74 connected to the input pipe 22 and a feed section 76 extending upwardly from the lateral section 74. The feed section 76 may include the check valve 51, as discussed above. The feed section 76 may then be connected in fluid communication with a further apparatus of the irrigation assembly 50, such as the bubbler 52.

The irrigation assembly 50 may also be provided with a screen filter 53, preferably located downstream of the check valve 51 or in the feed section 76, for restricting the entry of foreign particulate matter into the bubbler 52, for instance. The check valve 51, as depicted, is located within the assembly pipe 70. Alternatively, the check valve 51 may be a separate component located intermediate of the assembly pipe 70 and bubbler 52. The sleeve 34 further is generally open at its bottom end 34c, to which the bottom cap 32 is secured.

As discussed, the bubbler 52 emits water radially from the top plate 54. Beneficially, the bubbler 52 is positioned generally vertically so that the water does not flow predominantly to one side of the bubbler 52 and, hence, to one side of the sleeve 34. Although the side port 72 of the sleeve 34 may be provided with structure (not shown) for retaining the irrigation assembly 50 in an upright position, it is preferred that the top cap 30 provide retaining structure 80 for holding the irrigation assembly 50 by providing lateral constraint to sides 50a of the irrigation assembly 50.

In the present embodiment, the retaining structure 80 includes a generally cylindrical or annular retaining wall 82 positioned on the bottom surface 64 of the top cap 30. The diameter 84 of the retaining wall 82 is sized to receive a top portion 55 of the irrigation assembly 50 therein. However, as various components other than the bubbler 52 may be incorporated, it is preferred that the retaining wall 82 and its diameter 84 be such that components smaller than the diameter 84 be retained therein without significant tilting to one side, while the retaining wall 82 is slightly flexible to permit larger components to be received therebetween. Towards this end, the retaining wall 82 includes an opening or split 83, which also allows water to flow therethrough. In the event the retaining wall 82 fits tightly around the irrigation assembly top portion 55, the water may flow through central openings 60a, and then proceed downward and back into the device 10 through peripheral openings 60b.

Figure 6:
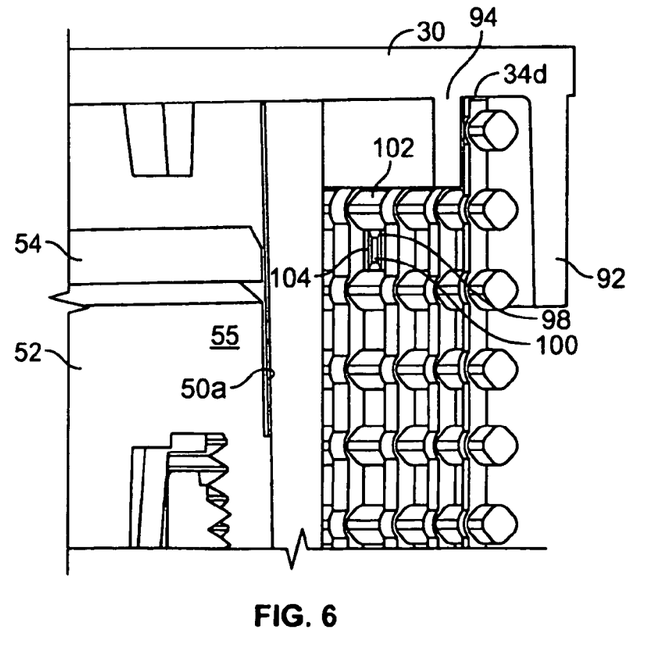
FIG. 6 is a fragmentary cross-sectional view of a top portion of the watering device showing cooperation between a body of the watering device and the mounting structure.
Figures 7, 8:
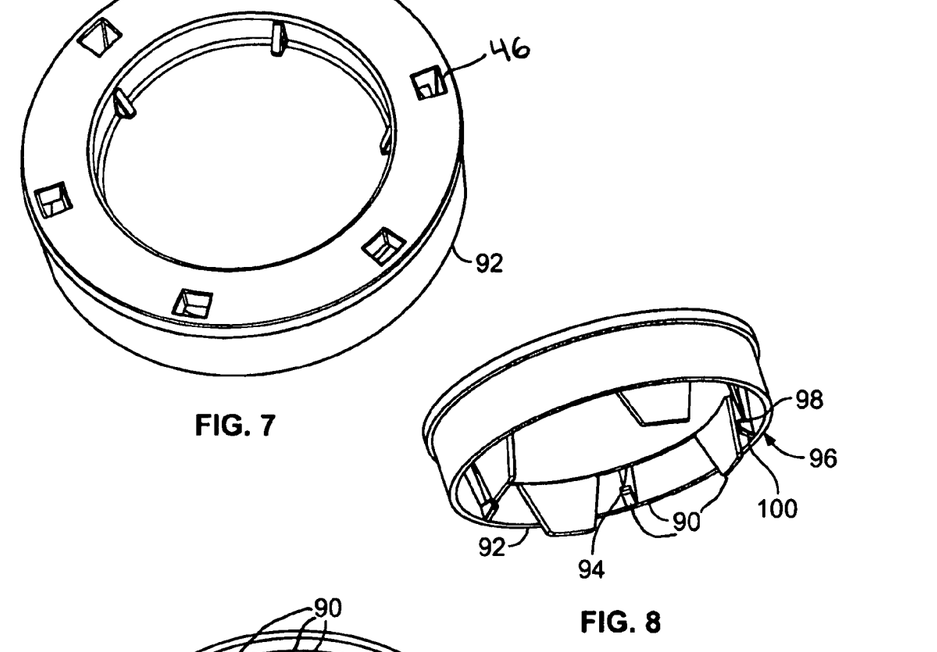
FIG. 7 is a perspective view of a bottom cap of the watering device.
FIG. 8 is a perspective view of the bottom cap showing mounting structure for securing the bottom cap with the watering device.
Figure 9:
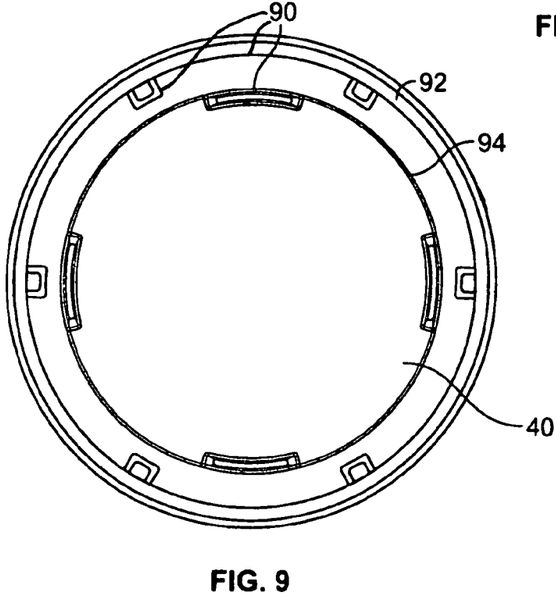
FIG. 9 is a top plan view of the bottom cap showing the mounting structure theron.

Each of the caps 30, 32 includes securing structure 90. As discussed, the caps 30, 32 are secured at respective top and bottom ends 34b, 34c of the sleeve 34. The securing structure 90 of each cap 30, 32 includes annular outer portion 92 and an annular inner portion 94 between which a portion of the sleeve 34 is received. The outer portions 92 include inwardly directed tabs 96 including an inwardly directed prong or hook 98. The tabs 96 and outer portion 92 are resiliently deformable such that, when the sleeve 34 is inserted between the inner and outer portions 94, 92, the tabs 96 may flex outwardly. In this manner, a bevel surface 100 on the prongs 98 cams over crosspieces 102 of the sleeve 34 (see FIG. 6). The sleeve 34 is inserted to a depth in the respective covers 30, 32 so that terminal edges 34d, 34e of the top and bottom ends 34b, 34c contact the top surface 42 of the bottom cap 32 and the bottom surface 64 of the top cap 30 (see FIGS. 2 and 6). At such a point, the prongs 98 are received in the mesh openings 104 of the sleeve 34. In this manner, the caps 30, 32 resist being removed from the sleeve 34. The surface 40, noted above, of the bottom cap 32 spans across the bottom cap inner portion 94 so that the surface 40 is positioned close to an inner periphery 106 of the sleeve 34.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A device for sub-surface distribution of water comprising:
- a body portion having opposite ends and sidewall portions between the two ends, the sidewall portions defining a cavity directly therebetween and radial openings permitting fluid flow from the cavity to an outside region surrounding at least a portion of the body portion, the openings extending over the entire longitudinal length of the sidewall portions;
- an irrigation assembly located within the cavity for receiving water and emitting water inside the body portion, the irrigation assembly having an inlet coupling for attachment to a conduit providing pressurized water, the conduit passing through and being supported at least in part by the body portion;
- a cap disposed on at least one of the opposite ends of the body portion;
- a retaining wall extending away from the cap into the cavity of the body portion for receiving and engaging at least a portion of the irrigation assembly to position the irrigation assembly within the cavity,
- wherein the retaining wall has a terminal free end and defines a split therethrough extending longitudinally from the terminal free end of the retaining wall and along the entire length of the retaining wall to the cap, the retaining wall generally defining an interior, transverse, cross-sectional area, and the retaining wall being flexible to change the transverse, cross-sectional area to engage and receive alternative irrigation assemblies of different sizes within the retaining wall.

2. The device of claim 1 wherein the retaining wall defines a hollow interior region and the cap defines at least one outlet port communicating with the hollow interior region and at least one inlet port communicating with the cavity about the retaining wall.

3. The device of claim 1 wherein the irrigation assembly includes a bubbler.

4. The device of claim 1 further comprising an outer rim extending away from the cap and engaging the body portion, and the retaining wall being spaced radially inward from both the outer rim and the body portion.

5. The device of claim 1 wherein the retaining wall receives fluid, and wherein the split is shaped and disposed to allow water downstream of the alternative irrigation assembly to pass radially through the retaining wall.

6. A device for sub-surface distribution of water comprising:
- a body portion having opposite ends and sidewall portions between the two ends, the sidewall portions defining a cavity directly therebetween and radial openings permitting fluid flow from the cavity to an outside region surrounding at least a portion of the body portion, the openings extending over the entire longitudinal length of the sidewall portions;
- an irrigation assembly located within the cavity for receiving water and emitting water inside the body portion, the irrigation assembly having an inlet coupling for attachment to a conduit providing pressurized water, the conduit passing through and being supported at least in part by the body portion;
- a cap disposed on at least one of the opposite ends of the body portion,
- wherein the cap includes a bottom surface and a retaining wall extending away from the cap into the cavity of the body portion for receiving and engaging at least a portion of the irrigation assembly, and
- wherein the retaining wall has a terminal free end and defines a split therethrough extending longitudinally from the terminal free end of the retaining wall and along the entire length of the retaining wall to the cap, the retaining wall generally defining an interior, transverse, cross-sectional area, and the retaining wall being flexible to change the transverse, cross-sectional area to engage and receive alternative irrigation assemblies of different sizes within the retaining wall; and
- a plurality of prongs associated with the cap and for extending into the radial openings, each of the plurality of prongs having a cam surface that cams over the body portion to facilitate installation of the cap on the body portion and a stop surface that interlocks with the body portion to resist removal of the cap from the body portion.

7. The device of claim 6 wherein the retaining wall defines a hollow interior region and the cap defines at least one outlet port communicating with the hollow interior region and at least one inlet port communicating with the cavity about the retaining wall.

8. The device of claim 6 wherein the irrigation assembly includes a bubbler.

9. The device of claim 6 further comprising an outer rim extending away from the cap and engaging the body portion, and the retaining wall being spaced radially inward from both the outer rim and the body portion.

10. The device of claim 6 wherein the retaining wall receives fluid, and wherein the split is shaped and disposed to allow water downstream of the alternative irrigation assembly to pass radially through the retaining wall.

11. The device of claim 6 wherein the cam surface is inclined to extend radially inward as the cam surface extends toward the bottom surface of the cap.

12. The device of claim 6 wherein the stop surface extends into one of the radial openings.

13. A device for sub-surface distribution of water comprising:
- a body portion having opposite ends and defining a cavity and openings permitting fluid flow from the cavity to a region surrounding at least a portion of the body portion;
- an irrigation assembly located within the cavity for receiving water and emitting water inside the body portion, the irrigation assembly having an inlet coupling for attachment to a conduit providing pressurized water, the conduit passing through and being supported at least in part by the body portion;
- a top cap disposed on one of the opposite ends of the body portion;
- a bottom cap disposed on the other of the opposite ends of the body portion, wherein at least one of the top cap and the bottom cap includes an interior surface and further comprising a retaining wall extending away from the interior surface of the at least one of the top cap and the bottom cap for receiving at least a portion of the irrigation assembly, wherein the retaining wall has a terminal free end and defines a split therethrough extending longitudinally from the terminal free end of the retaining wall and along the entire length of the retaining wall to the cap from which the retaining wall extends, the retaining wall generally defining an interior, transverse, cross-sectional area, and the retaining wall being flexible to change the transverse, cross-sectional area to engage and receive alternative irrigation assemblies of different sizes within the retaining wall; and a plurality of prongs associated with each of the top cap and the bottom cap, each of the plurality of prongs having a cam surface that cams over the body portion to facilitate installation of the top cap and the bottom cap on the body portion and a stop surface that extends into the body portion to interlock with the body portion to resist removal of the top cap and the bottom cap from the body portion.

14. The device of claim 13 wherein the retaining wall defines a hollow interior region and the at least one of the top cap and the bottom cap defines at least one outlet port communicating with the hollow interior region and at least one inlet port communicating with the cavity about the retaining cylinder.

15. The device of claim 13 wherein the irrigation assembly includes a bubbler.

16. The device of claim 13 further comprising an outer rim extending away from the cap and engaging the body portion, and the retaining wall being spaced radially inward from both the outer rim and the body portion.

17. The device of claim 13 wherein the retaining wall receives fluid, and wherein the split is shaped and disposed to allow water downstream of the alternative irrigation assembly to pass radially through the retaining wall.

18. The device of claim 13 wherein the cam surface is inclined to extend radially inward as the cam surface extends toward the bottom surface of the cap.

19. The device of claim 13 wherein the body portion includes a generally cylindrical side wall with a plurality of radially accessible openings and wherein the stop surface extends into one of the plurality of openings.

* * * * *